US012577378B2

(12) United States Patent
Mondal et al.

(10) Patent No.: US 12,577,378 B2
(45) Date of Patent: Mar. 17, 2026

(54) RUBBER COMPOSITION FOR TYRES

(71) Applicant: Apollo Tyres Global R&D B.V., Enschede (NL)

(72) Inventors: Anup Mondal, Enschede (NL); Mohamed Tharik, Enschede (NL)

(73) Assignee: APOLLO TYRES GLOBAL R&D B.V., Enschede (NL)

( * ) Notice: Subject to any disclaimer, the term of this patent is extended or adjusted under 35 U.S.C. 154(b) by 0 days.

(21) Appl. No.: 18/585,067

(22) Filed: Feb. 23, 2024

(65) Prior Publication Data

US 2024/0287291 A1 Aug. 29, 2024

(30) Foreign Application Priority Data

Feb. 24, 2023 (LU) .................................. LU103075

(51) Int. Cl.

| | |
|---|---|
| ***C08L 9/00*** | (2006.01) |
| ***B60C 1/00*** | (2006.01) |
| ***C08K 3/013*** | (2018.01) |
| ***C08K 3/36*** | (2006.01) |
| ***C08K 5/00*** | (2006.01) |
| ***C08K 5/548*** | (2006.01) |

(52) U.S. Cl.

CPC .............. *C08L 9/00* (2013.01); *B60C 1/0016* (2013.01); *C08K 3/013* (2018.01); *C08K 3/36* (2013.01); *C08K 5/0025* (2013.01); *C08K 5/548* (2013.01); *B60C 2200/04* (2013.01); *C08K 2201/006* (2013.01); *C08L 2205/025* (2013.01); *C08L 2205/035* (2013.01)

(58) Field of Classification Search

CPC ................. C08L 9/00; C08L 2205/025; C08L 2205/035; C08K 3/013; C08K 3/36; C08K 5/0025; C08K 5/548; C08K 2201/006

USPC .......................................................... 524/847

See application file for complete search history.

(56) References Cited

U.S. PATENT DOCUMENTS

| | | | |
|---|---|---|---|
| 7,342,070 B2 | 3/2008 | Tsukimawashi et al. | |
| 10,626,254 B1 | 4/2020 | Delville et al. | |
| 2002/0143096 A1 * | 10/2002 | Amaddeo | B60C 1/0016 152/450 |
| 2007/0197725 A1 | 8/2007 | Chaves et al. | |
| 2012/0225231 A1 | 9/2012 | York | |

FOREIGN PATENT DOCUMENTS

| | | |
|---|---|---|
| CN | 114230884 A | 3/2022 |
| EP | 0732362 A1 | 9/1996 |
| EP | 3825147 A1 | 5/2021 |
| EP | 4041819 A1 | 8/2022 |
| WO | 2021069514 A1 | 4/2021 |

OTHER PUBLICATIONS

Luxembourg Search Report and Written Opinion for corresponding Application No. LU 103075, issued Aug. 21, 2023.

* cited by examiner

*Primary Examiner* — Hannah J Pak

(74) *Attorney, Agent, or Firm* — RENNER, OTTO, BOISSELLE & SKLAR, LLP

(57) ABSTRACT

A cross-linkable rubber composition may include, per hundred parts by weight of rubber (phr): 100 phr of a blend of a natural rubber (NR), a polybutadiene rubber (BR), and first and second solution polymerized styrene-butadiene rubbers (SSBR); a silica filler, a resin, and ≥1 phr to ≤20 phr of first and second coupling agents, wherein the first coupling agent is a mercaptosilane and the second coupling agent is selected from a disulfide silane, a tetrasulfide silane, or a combination thereof.

18 Claims, No Drawings

RUBBER COMPOSITION FOR TYRES

This application claims priority to Luxembourg Application No. LU103075, filed Feb. 24, 2023, which is hereby incorporated herein by reference in its entirety.

The present invention relates to a cross-linkable rubber composition, a cross-linked rubber composition obtained by cross-linking the rubber composition, a method of preparing a tyre and a tyre.

Tread rubber is one of the important portions of a pneumatic tyre which contributes enormously to the overall performance of a tyre. A tyre has to perform well in severe weather conditions, and it has to exhibit a variety of performances, while particularly all-season tyres have to observe a balance of various properties such wet grip and rolling resistance. In addition, further requirements for all-season and winter tyres are required, such as retaining good performance on snow and ice. A tread compound can be optimized to exhibit good winter performance: but optimizing the tread compound for winter performance normally results in trade-off in rolling resistance.

Good rolling resistance compounds for tyre treads are achieved using silica-based rubber compounds. Silica offers tyre compounds with lower rolling resistance and higher wet grip, so less fuel consumption and better safety. A successful use of silica in rubber compounds however requires sufficient bonding and/or interaction between silica and rubber interphases. Sulfur containing silane coupling agent such as bis-(3-triethoxysilylpropyl) tetrasulfide (TESPT) are commonly applied in such compounds cured with sulfur system. The mixing of silica with silane in rubber involves a chemical reaction called silanization, and the extent of this reaction has a dramatic effect on the resulting compound properties. Further, the preparation of highly loaded silica-filled rubber compounds encounters processing difficulties due to strong filler-filler interactions that may cause silica flocculation during vulcanization.

When compared to carbon black, the interaction between silica and hydrocarbon rubber is weaker. However, an effective use of silane coupling agents can considerably promote a use of silica in tyre tread compounds. EP 4 041 819 A1 discloses a rubber composition for an all season-tread with a balanced property of snow and wet grip. The rubber composition comprises a blend of four rubbers selected from a natural rubber (NR), a polybutadiene rubber (BR), and first and second solution polymerized styrene-butadiene rubbers (SSBRs), a silica filler, a resin, and ≥1 phr to ≤20 phr of at least two coupling agents wherein one of the coupling agents is a mercaptosilane and wherein the ratio of the mercapto based silane to the second coupling agent is in a range of ≥2:1 to ≤10:1. The second coupling agent may be selected from a disulfide silane, a tetrasulfide silane, or a combination thereof.

Reinforcement of silica in tyre tread compounds is known to reduce hysteresis or energy loss, which leads to a production of energy-saving tyres. Even though a technology of using silica and a combination of silanes has been well established, further development to enhance its performance is still needed. One of the approaches is to use a second silica filler. CN 114230884 A is directed to a cross-linkable rubber composition for a summer tyre comprising two styrene-butadiene rubbers and optionally a natural rubber. The rolling resistance is reduced by a system of combining two silicas with different specific surface areas and two silane coupling agents to respectively modify the silica and the rubber to reduce the rolling resistance. However, summer tyres provide no snow performance.

The present invention has the object to at least partially overcome the drawbacks and in particular to provide a composition for a tyre tread for an all season-tread which provides improved handling performance on snow and on dry ground.

This object is achieved by a cross-linkable rubber composition according to claim 1, a cross-linked rubber composition according to claim 10, a method according to claim 14 and a tyre according to claim 15. Advantageous embodiments are the subject of dependent claims. They may be combined freely unless the context clearly indicates otherwise.

Hence, a cross-linkable rubber composition is provided, the cross-linkable rubber composition comprising, per hundred parts by weight of rubber (phr):

100 phr of a blend of a natural rubber (NR), a polybutadiene rubber (BR), and first and second solution polymerized styrene-butadiene rubbers (SSBR);

a silica filler, a resin, and

≥1 phr to ≤20 phr of first and second coupling agents, wherein the first coupling agent is a mercaptosilane and the second coupling agent is selected from a disulfide silane, a tetrasulfide silane, or a combination thereof, wherein the rubber composition comprises:

≥10 phr to ≤40 phr of NR:

≥20 phr to ≤80 phr of BR:

≥10 phr to ≤50 phr of the first SSBR having a glass transition temperature $T_g$ (measured by differential scanning calorimetry (DSC) according to ISO 22768) of ≥−30° C. to ≤0° C.:

≥10 phr to ≤30 phr of the second SSBR having a glass transition temperature $T_g$ (measured by differential scanning calorimetry (DSC) according to ISO 22768) of ≥−120° C. to ≤−40° C.:

≥60 phr to ≤130 phr of a first silica filler having a BET surface area in a range of ≥150 $m^2/g$ to ≤ 200 $m^2/g$ (measured according to ASTM D1993), and ≥10 phr to ≤100 phr of a second silica filler having a BET surface area in a range of ≥70 $m^2/g$ to ≤100 $m^2/g$ (measured according to ASTM D1993).

It has surprisingly been found that such a rubber composition comprising a blend of four rubbers and two silicas of different BET surface area provides for an improved handling performance on snow as well as on dry ground of high-performance all-season tyres (HP) and ultra-high performance all-season tyres (UHP), without compromising rolling resistance. A combination of good handling performance at ambient temperature (usually denoted dry handling) and on snow (usually denoted snow handling) provides a notable advantage, as this is difficult to balance. The composition further provides a balanced property of snow and wet grip.

As used herein, the term "handling" refers to how well a vehicle handles the road and how well the vehicle responds to steering input. Tyre handling is a measurement of what a driver can perform with a car such as steering, stability during lane change and cornering, lap time, accelerating and braking.

It will be understood that in formulations discussed in connection with the present invention the phr amount of all rubber components adds up to 100 phr. To differentiate between the two different solution polymerized styrene-butadiene rubbers (SSBRs), terms like first SSBR and second SSBR are used. In embodiments where two different silica fillers are present, the terms first silica filler and second silica filler are used likewise to differentiate between the respective silicas. The cross-linkable rubber composition according to the invention comprises cross-linkable groups in the individual rubber components. They may be cross-linked (cured, vulcanised) by methods known to a skilled person in the rubber technology field.

The rubber composition comprises two silica fillers of different BET surface area. The BET (Brunauer, Emmett and Teller) theory is commonly used to evaluate gas adsorption data and generate a specific surface area result expressed in units of area per mass of sample ($m^2/g$). The technique is referenced by several standard organizations such as ASTM. The first silica filler has a BET surface area in a range of $\geq 150$ $m^2/g$ to $\leq 200$ $m^2/g$ (according to ASTM D1993) and the second silica filler has a BET surface area in a range of $\geq 70$ $m^2/g$ to $\leq 100$ $m^2/g$ (ASTM D1993).

In embodiments, the first silica filler has a BET surface area in a range of $\geq 150$ $m^2/g$ to $\leq 170$ $m^2/g$ (according to ASTM D1993). Silica which meets a BET surface area of 150 to 200 $m^2/g$ or 150 to 170 $m^2/g$ (according to ASTM D1993) includes highly dispersible silica (HDS) and semi HDS. Highly dispersible silica may be precipitated from a silicate solution, for example, by hydrolysis and/or high temperature oxidation conversion. Examples of commercial silica having a BET surface area of 150 to 170 $m^2/g$ are Ultrasil® 7000GR (Evonik Industries AG), Zeosil 1165MP (Solvay AG), and HiSil IZ 160GD (PPG Industries).

In embodiments, the second silica filler has a BET surface area in a range of $\geq 75$ $m^2/g$ to $\leq 95$ $m^2/g$ (according to ASTM D1993). An example of a commercial silica having a BET surface area of 75 to 95 $m^2/g$ is Zeosil 1085 (Solvay AG).

It is assumed that the combination of first and second silica at least partially provides for the improvement in the handling while maintaining rolling resistance of the tyre. This is particularly useful for high-performance all season-tyres, In embodiments, the rubber composition comprises the second silica filler in an amount in a range of from $\geq 25$ phr to $\leq 80$ phr, preferably in a range of from $\geq 40$ phr to $\leq 80$ phr. In these ranges improved handling could be combined with favourable wet grip properties of the cured tyre. It was particularly found by utilizing phase morphology technology that an increase in the amount of silica with a BET surface area in a range of $\geq 75$ $m^2/g$ to $\leq 95$ $m^2/g$ in a silica blend resulted in enhancing the snow handling and dry handling while maintaining wet grip and rolling resistance.

In embodiments, the rubber composition comprises the first silica filler in an amount in a range of from $\geq 70$ phr to $\leq 120$ phr, preferably in a range of from $\geq 75$ phr to $\leq 110$ phr.

The rubber composition may comprise of from $\geq 40$ phr to $\leq 80$ phr of the second silica filler and of from $\geq 75$ phr to $\leq 95$ phr of the first silica filler. In embodiments, the rubber composition may comprise the second silica filler in an amount about half of the amount of the first silica filler, such as about 95 phr of the first silica filler and about 40 phr of the second silica filler. Such embodiments provide particularly balanced properties of handling, rolling resistance and snow performance. In embodiments, the rubber composition may comprise about equal amounts of first and second silica filler, such as about 75 phr of the first silica filler and about 80 phr of the second silica filler. Such embodiments provide particularly good morphology and handling properties.

In embodiments, the rubber composition comprises first and second silica filler in an amount in a range of $\geq 120$ phr to $\leq 160$ phr, preferably in a range of $\geq 130$ phr to $\leq 160$ phr. It is assumed that the combination of first and second silica facilitates achievability of high filler levels of silica supporting the favourable handling properties.

The rubber composition may comprise carbon black. The rubber composition may comprise carbon black in an amount in a range of $\geq 1$ phr to $\leq 15$ phr.

The composition comprises a blend of four rubbers, a natural rubber (NR), a polybutadiene rubber (BR), and first and second solution polymerized styrene-butadiene rubbers (SSBRs) of different glass transition temperature. Without being bound to a specific theory it is assumed that the polymer blend contributes to the good handling performance on different underground of the cured composition that is necessary for all season tyres.

In embodiments, the butadiene rubber (BR) has a cis group content, as determined by infrared spectroscopy (IR), of $\geq 95\%$, preferably of $\geq 97\%$. A butadiene rubber (BR) with a high cis group content, is obtained under neodymium catalysis (Nd BR). The cis content of the polybutadiene rubber may be determined with FTIR (Fourier-transform infrared spectroscopy). Butadiene rubber obtained under neodymium catalysis may be denoted a cis 1,4-polybutadine.

The natural rubber may be a sheet processed natural rubber such as a Ribbed Smoked Sheets (RSS) rubber or may be a Technically Specified Rubber (TSR). TSR grades such as TSR10, TSR20 are preferred for a tyre tread compound.

The first SSBR has a glass transition temperature $T_g$ of $\geq -30°$ C. to $\leq 0°$ C. The glass transition temperatures $T_g$ of the rubber compounds as referred herein are measured by differential scanning calorimetry (DSC) according to ISO 22768. This norm specifies a heating rate of 20° C./min. Preferably the first SSBR has a glass transition temperature $T_g$ of $\geq -28°$ C. to $\leq -20°$ C. The first SSBR thus is a rubber with comparatively high $T_g$.

Such a SSBR preferably comprises alkoxysilane groups such as —$Si(OR)_3$ with each R independently being an alkyl rest. Preferred are trimethoxysilane groups and triethoxysilane groups. Furthermore, this SSBR also comprises primary amino groups-$NH_2$. Such dual-functionalised SSBRs are commercially available and may be synthesised from non-functionalised SSBRs by methods known in the art such as hydrosilylation with H—$Si(OR)_3$ compounds, thiol-ene-coupling using aminothiol compounds and hydrosilylation with H—$Si(OR)_2$-Linker-$NH_2$ compounds. For example, and as taught in U.S. Pat. No. 7,342,070, the first rubber may be of the formula (I) or (II):

I

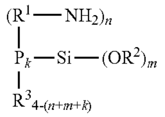

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

II

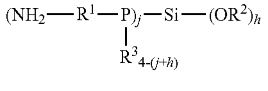

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4. The first SSBR may comprise ≥25% to ≤35%, preferably ≥27 to ≤29%, as determined by nuclear magnetic resonance (NMR) spectroscopy, of styrenic groups. In the first SSBR ≥75 mol-%, preferably ≥90 mol-% to ≤100 mol-%, as determined by nuclear magnetic resonance (NMR) spectroscopy, of the alkoxysilane groups and the primary amino groups are located at the chain ends of the rubber polymer chains. A specific example for a commercial SSBR having a $T_g$ of ≥−30° C. to ≤0° C. is HPR850 manufactured by JSR Corporation.

The first SSBR is combined with a second low $T_g$ SSBR. The second solution polymerized styrene-butadiene rubber (SSBR) has a glass transition temperature $T_g$ (measured by differential scanning calorimetry (DSC) according to ISO 22768) of ≥−120° C. to ≤−40° C. Preferably, the second SSBR has a glass transition temperature $T_g$ of ≥−90° C. to ≤−50° C., more preferably of ≥−80° C. to ≤−60° C. Using a low $T_g$ SSBR in combination with a first high $T_g$ SSBR can improve snow and rolling resistance performance in balance with wet grip. Preferably, the second SSBR is a functionalised styrene-butadiene rubber. A specific example for a commercial SSBR having a $T_g$ of ≥−120° C. to ≤−40° C. is SPRINTAN™ SLR 3402, with $T_g$ of −65° C.

In embodiments, the composition comprises:

- ≥10 phr to ≤25 phr, preferably ≥15 phr to ≤20 phr, of NR:
- ≥30 phr to ≤45 phr, preferably ≥35 phr to ≤40 phr, of BR:
- ≥20 phr to ≤30 phr, preferably ≥20 phr to ≤25 phr, of the first SSBR having a glass transition temperature $T_g$ (measured by differential scanning calorimetry (DSC) according to ISO 22768) of ≥−30° C. to ≤0° C.;
- ≥10 phr to ≤20 phr, preferably ≥10 phr to ≤15 phr, of the second SSBR having a glass transition temperature $T_g$ (measured by differential scanning calorimetry (DSC) according to ISO 22768) of ≥−120° C. to ≤−40° C.

It is understood that the phr amount of all rubber components in the composition adds up to 100 phr.

The cross-linkable rubber composition comprises two coupling agents, where the first coupling agent is a mercaptosilane and the second coupling agent is selected from a disulfide silane, a tetrasulfide silane, or a combination thereof. The use of a mercaptosilane in combination with a silane selected from a disulfide silane, a tetrasulfide silane, or a combination thereof was found to improve the hysteresis of the composition comprising a rubber blend. The ratio of the mercaptosilane to the silane may be in a range of ≥2:1 to ≤10:1, preferably in a range of ≥2:1 to ≤ 4:1. In the context of this invention a "mercaptosilane" denotes a silane coupling agent containing one or more mercapto group(s). Examples for mercaptosilanes are 3-mercaptopropylmethyldimethoxysilane, 3-mercaptopropyltrimethoxysilane, and 3-isocyanatopropyltriethoxysilane. A commercial example for mercaptosilane is Silaan VP Si 363 Degussa available by Evonik Industries. A specific example for a disulphide silane is TESPD available by Evonik Industries. A specific example for a tetrasulphide silane is TESPT available by Evonik Industries. The cross-linkable rubber composition may comprise ≥1 phr to ≤15 phr of the at least two coupling agents.

In embodiments, the ratio of the first silica filler having a BET surface area in a range of ≥150 $m^2/g$ to ≤200 $m^2/g$ (according to ASTM D 2414) to the mercaptosilane coupling agent is in a range of ≥8:1 to ≤10:1, preferably in a range of ≥9:1 to ≤10:1. A ratio of silica filler mercaptosilane in such ranges may improve a balanced rolling resistance and snow performance.

In embodiments, the composition comprises ≥1 phr of a resin. The cross-linkable rubber composition may comprise ≥1 phr≤35 phr, preferably ≥12 phr to ≤25 phr, of a resin. The resin may have a glass transition temperature $T_g$ of ≥30° C., preferably of ≥60° C. to ≤130° C. The resin may be an aromatic resin, aliphatic resin, terpene resin, polyterpene resin, terpene phenolic resin, alpha methyl styrene (AMS) resins, a C5 resin, C9 resin, dicyclopentadiene (DCPD) resin or a combination thereof. In embodiments, the composition comprises ≥1 phr≤35 phr, preferably ≥12 phr to ≤25 phr of an aliphatic or aromatic resin.

The cross-linkable rubber compositions may be sulfur-vulcanizable and/or peroxide-vulcanizable. If desired, additives can be added. Examples of usual additives are stabilizers, antioxidants, lubricants, fillers, dyes, pigments, flame retardants, conductive fibres and reinforcing fibres.

Another aspect of the present invention relates to a cross-linked rubber composition that is obtained by cross-linking a rubber composition according to the invention.

In an embodiment, the cross-linked rubber composition has a G' at 0° C. (determined from DMA measurements according to ISO 4664-1) a range from ≥7.5 MPa to ≤15 MPa.

In an embodiment, the cross-linked rubber composition has a G' at 20° C. (determined from DMA measurements according to ISO 4664-1) in a range from ≥5 MPa to ≤9 MPa.

In an embodiment, the cross-linked rubber composition has a G' at 70° C. (determined from DMA measurements according to ISO 4664-1) in a range from ≥1.7 MPa to ≤2.3 MPa. Such ranges are indicative for good handling properties of the cured tyre.

In other embodiments of the cross-linked rubber composition, the tan delta at 0° C. may be in a range of ≥0.2 to ≤0.3 (determined from dynamic mechanical analysis (DMA) measurements according to ISO 4664-1, frequency 10 Hz, 0.1% dynamic strain) and/or the tan delta at 70° C. may be in a range of ≥0.1 to ≤0.15 (determined from DMA measurements according to ISO 4664-1, frequency 10 Hz, 6% dynamic strain).

In another embodiment the cross-linked rubber composition has a rebound at 23° C., determined according to ISO 4662, of ≥30% to ≤40%. Such ranges are indicative for good wet grip.

The present invention also relates to a method of preparing a tyre, comprising the steps of:

- providing a tyre assembly comprising a rubber composition according to the invention, and
- cross-linking at least the rubber composition according to the invention in the tyre assembly.

The present invention also encompasses a tyre comprising a tyre tread, characterised in that the tyre tread comprises a cross-linked rubber composition according to the invention.

The present invention will be further described with reference to the following examples without wishing to be limited by them.

Methods:

Hardness Test: A hardness test was performed on a Zwick 3150 Shore A Hardness Tester according to DIN-53505 at 23° C. The hardness (in Shore A) for a test specimen was measured by making 5 determinations at different positions using a Durometer type A as described in the Hardness Shore A manual from Zwick. The determinations were at least 6.0 mm apart and at least 12 mm from any edge.

The filler dispersion FM (dk) was determined using microscope macro dispersion method based on ISO1135.

Tensile strength: Tensile strength analysis was performed for cured samples on a Zwick Z005 apparatus with a speed of 500 mm/min speed. Samples were cured at 160° C. for 20 minutes and standard tensile specimens were cut from rubber sheet according to ISO 37 standard. Measuring tensile strength and force elongation properties via tensile method also determines modulus at various elongations i.e. 25%, 100%, 200% and 300% which indicates static stiffness.

Rebound: Rebound measurements were performed for cured samples on a Zwick/Roell 5109 Rebound Resilience Tester according to the standardised ISO4662 method at 23° C. and 70° C.

Temperature sweep by DMA: Dynamic mechanical analysis (DMA) analysis was performed for cured samples by Metravib DMA+450 in double shear mode. DMA was performed by temperature sweep at constant frequency 10 Hz with 6% strain in a temperature range of 25° C. to 80° C. DMA was also performed by temperature sweep at constant frequency 10 Hz with 0.1% strain in a temperature range of −80° C. to 25° C.

EXAMPLE 1

In accordance with the preceding, cross-linkable rubber compositions were prepared according to the following table 1. In a first step, the rubber components were added and mixed, followed by a second step wherein the additives were added and mixed and a last step wherein the curing package was added. Composition is a comparative example and compositions B1, B2, B3 and B4 are the compositions according to the invention. Amounts for the components are given in phr. Unless stated otherwise, glass temperatures given were determined by DSC according to ISO 22768.

TABLE 1

Composition of Examples:

| Component | Ref1 (phr) | B1 (phr) | B2 (phr) | B3 (phr) | B4 (phr) |
|---|---|---|---|---|---|
| NR | 20 | 20 | 20 | 20 | 20 |
| BR | 40 | 40 | 40 | 40 | 40 |
| SSBR 1 | 25 | 25 | 25 | 25 | 25 |
| SSBR 2 | 15 | 15 | 15 | 15 | 15 |
| mercaptosilane | 9 | 10 | 10 | 9 | 7.5 |
| Hydrocarbon Resin | 17 | 20 | 20 | 20 | 20 |
| Silica 1 | 105 | 112 | 107 | 95 | 75 |
| Silane | 1.20 | 1.6 | 1.6 | 1.6 | 3.2 |
| Silica 2 | — | 15 | 25 | 40 | 80 |
| Carbon black | 4 | 4 | 4 | 4 | 4 |
| Curing agents | 5 | 5 | 5 | 5 | 5 |

Natural rubber (NR) was TSR 20, with a Mooney Viscosity 80 and a $T_g$ of −70° C.

BR rubber was Nd catalyzed 1,4 butadiene rubber with a cis content of 97%, supplied by Arlanxeo (Buna CB 25).

SSBR 1 was HPR850 manufactured by JSR Corporation, a solution polymerized styrene-butadiene rubber (SSBR) comprising an alkoxysilane group and a primary amino group with a styrene content of 27.5 wt. % and vinyl content of 59% and a $T_g$ of −25° C. Non-oil extended product was used.

SSBR 2 was SPRINTAN™ SLR 3402, a functionalised SSBR and had a styrene content of 15%, a vinyl content of 30% and a $T_g$ of −65° C.

Silica 1 was High Dispersion Micro-Pearl Silica (HDS, MP) supplied by PPG Industries. Silica 2 was Zeosil 1085 from Solvay) Carbon black was N339.

Mercaptosilane was Silaan VP Si 363 Degussa supplied by Evonik Industries.

Silane was TESPD (disulphide silane) supplied by Evonik Industries.

The resin was Sylvatraxx 4202 with a molecular weight of 565 g/mol supplied by Kraton Corporation.

Durometer hardness (shore A) were measured to relate to physical properties.

Filler dispersion FM (dk) was measured relating to phase morphology.

Tan delta (70° C.) was measured relating to rolling resistance (RR).

Rebound at 23° C. and Tan delta (0° C.) were measured relating to wet grip.

G' (−20° C.) was measured relating to snow performance.

G' (0° C.) was measured relating to handling.

Tan delta (0° C.) was measured relating to wet grip.

G' (20° C.) was measured relating to handling.

T tan_max was measured relating to snow performance ($T_g$-glass transition temperature).

G' (70° C.) was measured relating to handling.

Tan delta (70° C.) was measured relating to rolling resistance (RR).

TABLE 2

Test results:

| Component | Ref1 | B1 | B2 | B3 | B4 |
|---|---|---|---|---|---|
| Durometer hardness shore A, 9' at 170° C. | | | | | |
| Hardness (median) [°Sh A] | 60.90 | 60.90 | 61.90 | 61.90 | 64.00 |
| Filler dispersion FM (dk) RnD ONLY | | | | | |
| Filler dispersion FM (dk) [%] | 85.47 | 88.98 | 89.96 | 89.27 | 95.65 |
| Rebound at 23° C., 12' 170° C. | | | | | |
| Rebound (23° C.) [%] | 38.70 | 35.30 | 34.80 | 36.50 | 31.30 |
| DMA double shear −80° C. to 25° C. at 0.1% | | | | | |
| G' (−20° C.) [MPa] | 15.52 | 20.04 | 21.64 | 21.91 | 35.00 |
| G' (0° C.) [MPa] | 6.93 | 8.05 | 8.36 | 8.55 | 14.00 |
| TanD (0° C.) | 0.201 | 0.218 | 0.221 | 0.221 | 0.215 |
| G' (20° C.) [MPa] | 4.65 | 5.20 | 5.33 | 5.54 | 8.90 |
| T tan_max [° C.] | −32.26 | −30.02 | −30.32 | −29.74 | −30.13 |
| DMA double shear 25° C. to 80° C. at 6% | | | | | |
| G' (70° C.) [MPa] | 1.66 | 1.77 | 1.79 | 1.85 | 2.27 |
| tan (70° C.) | 0.12 | 0.13 | 0.13 | 0.13 | 0.14 |

The results show for the compositions B1 to B4 compared to the reference composition an increase in filler dispersion, which is considered an indicator of better phase morphology. Further, all compositions B1 to B4 showed an increase in G' (0° C.), G' (20° C.) and G' (70° C.), which are considered indicators of better handling. Particularly T tan_max, relating to the glass transition temperature of the cured rubber composition, illustrated good behavior on snow. The indicator of rolling resistance (RR), tan delta at 70° C., illustrates that rolling resistance was maintained compared to the reference. Tan delta at 0° C. increased, while also the reduction in rebound at 23° C. is a well-known indicator of an increase in the wet grip of compositions B1 to B4. Lower rebound value at −23° C. relates to an improvement in wet grip. In a similar fashion, a higher tan 8 at 0° C. is related to better wet grip. Compositions B2 and particularly B3 showed best compatibility of improved handling with rolling resistance and snow and wet grip, while composition B4 showed best handling indicators.

In summary, the results illustrate an improvement in handling of compositions well equipped for high performance all season-tyres, without compromising rolling resistance and further providing a balanced property of snow and wet grip. Without being bound to a specific theory, it is believed that this results from a combination of silica fillers od differing BET surface area in a blend of natural rubber, polybutadiene rubber, and two solution polymerized styrene-butadiene rubbers having different $T_g$.

The invention claimed is:

1. A cross-linkable rubber composition, the cross-linkable rubber composition comprising, per hundred parts by weight of rubber (phr):

100 phr of a blend of a natural rubber (NR), a polybutadiene rubber (BR), and first and second solution polymerized styrene-butadiene rubbers (SSBR);

a first silica filler and a second silica filler, a resin; and

≥1 phr to ≤20 phr of a first coupling agent and a second coupling agent, wherein the first coupling agent is a mercaptosilane and the second coupling agent is selected from a disulfide silane, a tetrasulfide silane, or a combination thereof, wherein the rubber composition comprises:

≥10 phr to ≤40 phr of NR;

≥20 phr to ≤80 phr of BR;

≥10 phr to ≤50 phr of the first SSBR having a glass transition temperature $T_g$ of ≥−30° C. to ≤0° C., measured by differential scanning calorimetry (DSC) according to ISO 22768;

≥10 phr to ≤30 phr of the second SSBR having a glass transition temperature $T_g$ of ≥−120° C. to ≤−40° C., measured by differential scanning calorimetry (DSC) according to ISO 22768;

≥60 phr to ≤130 phr of the first silica filler, wherein the first silica filler has a BET surface area in a range of ≥150 $m^2/g$ to ≤200 $m^2/g$, measured according to ASTM D1993, and ≥10 phr to ≤100 phr of the second silica filler, wherein the second silica filler has having a BET surface area in a range of ≥70 $m^2/g$ to ≤100 $m^2/g$, measured according to ASTM D1993, wherein the total amount of the first and second silica fillers is in a range of ≥130 phr to ≤160 phr.

2. The rubber composition according to claim 1, wherein the rubber composition comprises the second silica filler in an amount in a range of ≥25 phr to ≤80 phr.

3. The rubber composition according to claim 1, wherein the second silica filler has a BET surface area in a range of ≥75 $m^2/g$ to ≤95 $m^2/g$, measured according to ASTM D1993.

4. The rubber composition according to claim 1, wherein the first silica filler has a BET surface area in a range of ≥150 $m^2/g$ to ≤170 $m^2/g$, measured according to ASTM D1993.

5. The rubber composition according to claim 1, wherein the rubber composition comprises the first silica filler in an amount in a range of ≥70 phr to ≤120 phr.

6. The rubber composition according to claim 1, wherein the composition comprises:

≥10 phr to ≤25 phr of NR;

≥30 phr to ≤45 phr of BR;

≥20 phr to ≤30 phr of the first SSBR having a glass transition temperature ($T_g$) of ≥−30° C. to ≤0° C., measured by differential scanning calorimetry (DSC) according to ISO 22768;

≥10 phr to ≤20 phr of the second SSBR having a glass transition temperature ($T_g$) of ≥−120° C. to ≤−40° C., measured by differential scanning calorimetry (DSC) according to ISO 22768.

7. The rubber composition according to claim 1, wherein the ratio of the first silica filler having a BET surface area in a range of ≥150 $m^2/g$ to ≤200 $m^2/g$, measured according to ASTM D1993, to the mercaptosilane coupling agent is in a range of ≥8:1 to ≤10:1.

8. The rubber composition according to claim 1, wherein the composition comprises ≥1 phr of the resin.

9. A cross-linked rubber composition characterized in that it is obtained by cross-linking the rubber composition according to claim 1.

10. The cross-linked rubber composition according to claim 9, wherein the cross-linked rubber composition has a G' at 0° C., determined from DMA measurements according to ISO 4664-1, in a range from ≥7.5 MPa to ≤15 MPa.

11. The cross-linked rubber composition according to claim 9, wherein the cross-linked rubber composition has a G' at 20° C., determined from DMA measurements according to ISO 4664-1, in a range from ≥5 MPa to ≤9 MPa.

12. The cross-linked rubber composition according to claim 9, having a G' at 70° C., determined from DMA measurements according to ISO 4664-1, in a range from ≥1.7 MPa to ≤2.3 MPa.

13. A method of preparing a tire, comprising the steps of:

providing a tire assembly comprising the rubber composition according to claim 1 and cross-linking the rubber composition.

14. A tire comprising a tire tread, characterized in that the tire tread comprises the cross-linked rubber composition according to claim 10.

15. The rubber composition according to claim 1, wherein the rubber composition comprises the second silica filler in an amount in a range of ≥40 phr to ≤80 phr.

16. The rubber composition according to claim 1, wherein the rubber composition comprises the first silica filler in an amount in a range of ≥75 phr to ≤110 phr.

17. The rubber composition according to claim 1, wherein the composition comprises:

≥15 phr to ≤20 phr, of NR;

≥35 phr to ≤40 phr, of BR;

≥20 phr to ≤25 phr, of the first SSBR having a glass transition temperature ($T_g$) of ≥−30° C. to ≤0° C., measured by differential scanning calorimetry (DSC) according to ISO 22768;

≥10 phr to ≤15 phr, of the second SSBR having a glass transition temperature ($T_g$) of ≥−120° C. to ≤−40° C., measured by differential scanning calorimetry (DSC) according to ISO 22768.

18. The rubber composition according to claim 1, wherein the ratio of the first silica filler having a BET surface area in a range of ≥150 $m^2/g$ to ≤200 $m^2/g$, measured according to ASTM D1993, to the mercaptosilane coupling agent is in a range of ≥9:1 to ≤10:1.

* * * * *